(12) United States Patent
Noda

(10) Patent No.: US 11,624,892 B2
(45) Date of Patent: Apr. 11, 2023

(54) LENS APPARATUS AND IMAGE PICKUP APPARATUS

(71) Applicant: CANON KABUSHIKI KAISHA, Tokyo (JP)

(72) Inventor: Atsuto Noda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 386 days.

(21) Appl. No.: 16/905,648

(22) Filed: Jun. 18, 2020

(65) Prior Publication Data

US 2020/0400914 A1 Dec. 24, 2020

(30) Foreign Application Priority Data

Jun. 20, 2019 (JP) .............................. JP2019-114657

(51) Int. Cl.
  *G02B 7/04* (2021.01)
  *G03B 5/02* (2021.01)

(52) U.S. Cl.
  CPC ................. *G02B 7/04* (2013.01); *G03B 5/02* (2013.01); *G03B 2205/0046* (2013.01)

(58) Field of Classification Search
  CPC ..... G02B 7/04; G03B 5/02; G03B 2205/0046
  USPC .......................... 359/699, 823, 824, 826, 830
  See application file for complete search history.

(56) References Cited

FOREIGN PATENT DOCUMENTS

| JP | 2013-003452 A | | 1/2013 |
|----|---------------|---|--------|
| JP | 2013003452 A | * | 1/2013 |

* cited by examiner

*Primary Examiner* — William Choi
(74) *Attorney, Agent, or Firm* — Cowan, Liebowitz & Latman, P.C.

(57) ABSTRACT

A lens apparatus includes an urging member disposed between first and second lens holding members, a first guide member including a first receiver configured to receive the urging member, and a first guide protrusion extending in an optical axis direction from the first receiver toward the second lens holding member, and a second guide member including a second receiver configured to receive the urging member; and a second guide protrusion extending in the optical axis direction from the second receiver toward the first lens holding member. The first and second guide protrusions have areas that always overlap each other in the optical axis direction in a use state. When the first and second lens holding members are closer to each other than a predetermined state, at least part of the first and second guide protrusions protrudes from the first or second receiver.

9 Claims, 9 Drawing Sheets

LENS APPARATUS AND IMAGE PICKUP APPARATUS

BACKGROUND OF THE INVENTION

Field of the Invention

The present invention relates to a lens apparatus that can move a lens unit in an optical axis direction.

Description of the Related Art

Some conventional lens barrels that perform zooming by moving a lens unit in an optical axis direction. The lens unit has a cam follower engaged with a cam, and can move in the optical axis direction along the cam. Any plays between the cam and the cam follower may cause distances between the lens units to change or tilt depending on the orientation and position of the lens barrel, and reduce the optical performance of the lens apparatus.

Japanese Patent Laid-Open No. ("JP") 2013-3452 discloses a lens barrel that includes a cylinder having a compression spring between lens units and removes the unsteady engagement between the cam and the cam follower through the decompression.

However, the cylinder structure of the lens barrel disclosed in JP 2013-3452 has a limited expansion (or stretching) rate of the spring. When the operation such as zooming changes the relative distance between the lens units that are biased by the compression spring, the cylinder needs to be more than twice as long as the distance changing amount between the lens units and the lens apparatus becomes larger.

SUMMARY OF THE INVENTION

The present invention provides a compact lens apparatus and an image pickup apparatus having the same, each of which can hold lens units with high accuracy.

A lens apparatus according to one aspect of the present invention includes a first lens holding member held by a first cam follower that is movable in an optical axis direction, a second lens holding member held by a second cam follower that is movable in the optical axis direction, an urging member disposed between the first lens holding member and the second lens holding member, a first guide member configured to contact the first lens holding member and to guide the urging member, and a second guide member integrated with the second lens holding member and configured to guide the urging member. The first guide member includes a first receiver configured to receive the urging member, and a first guide protrusion extending in the optical axis direction from the first receiver toward the second lens holding member. The second guide member includes a second receiver configured to receive the urging member, and a second guide protrusion extending in the optical axis direction from the second receiver toward the first lens holding member. The first guide protrusion and the second guide protrusion have areas that always overlap each other in the optical axis direction in a use state. In a state where the first lens holding member and the second lens holding member are closer to each other than they are in a predetermined state, at least part of the first guide protrusion and the second guide protrusion protrudes from the first receiver or the second receiver.

An image pickup apparatus having the above lens apparatus also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

Figure 1:
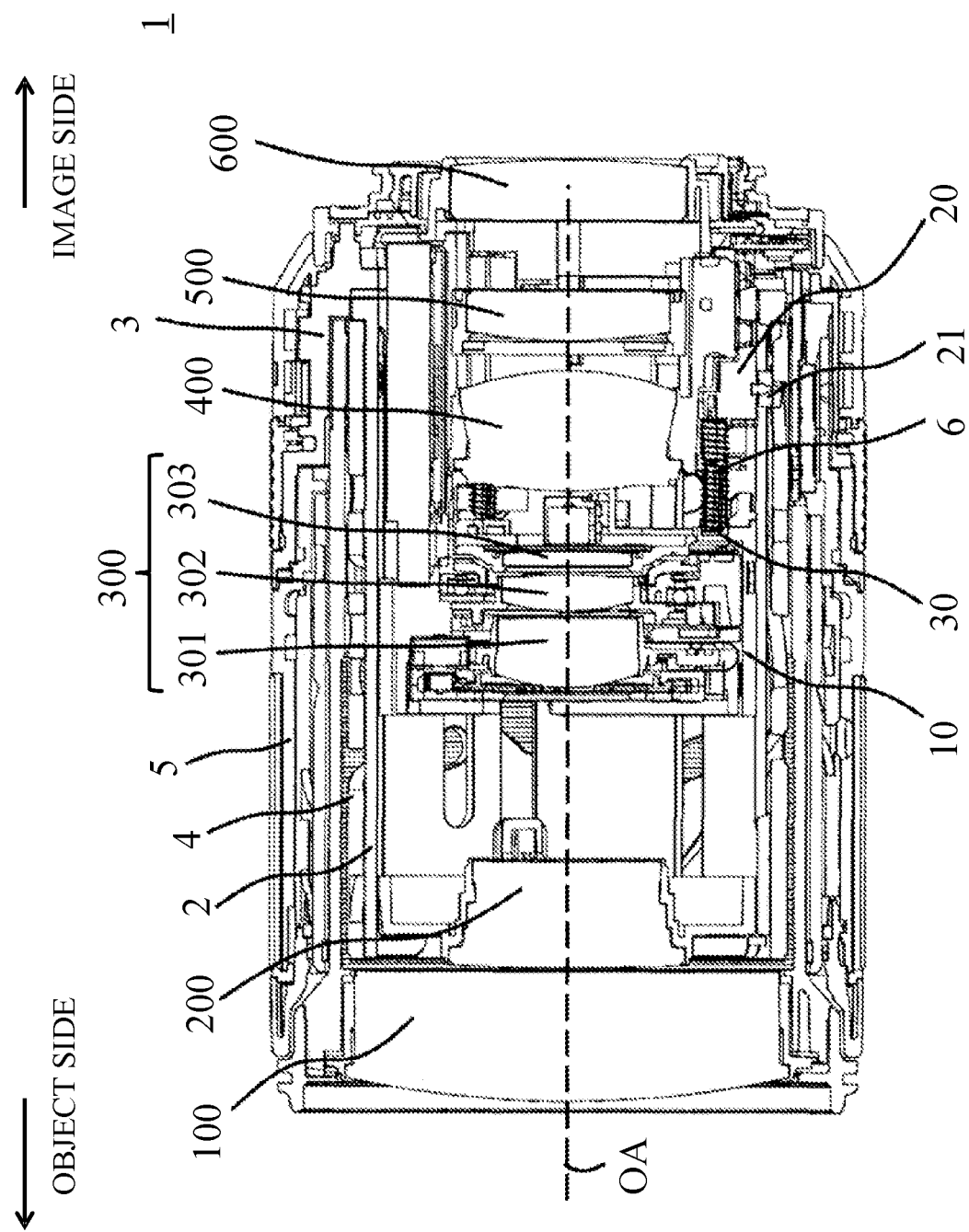
FIG. 1 is a sectional view of a lens barrel according to one embodiment in a WIDE (wide-angle) state.
Figure 2:
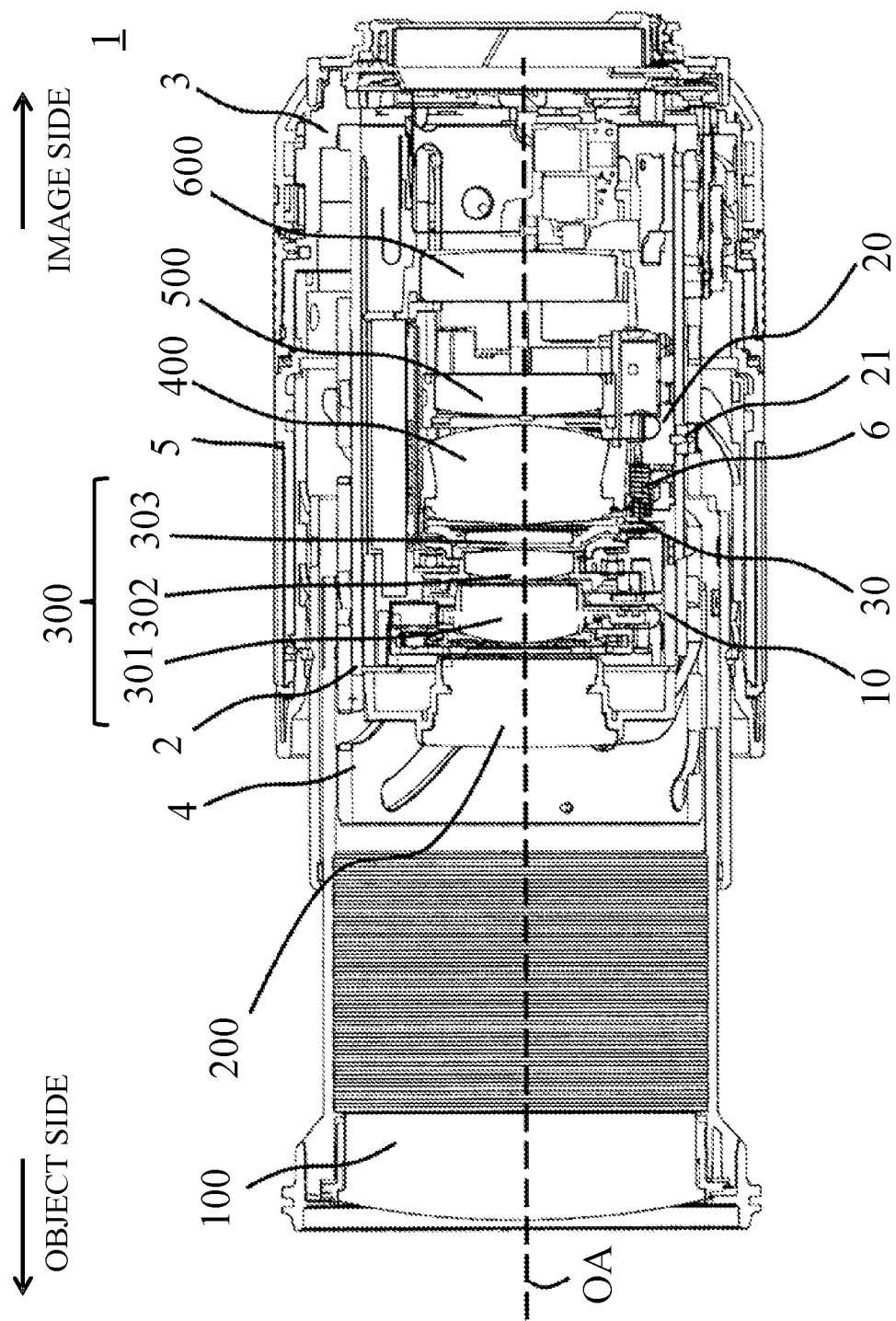
FIG. 2 is a sectional view of the lens barrel according to this embodiment in a TELE (telephoto) state.

Referring now to FIGS. 1 and 2, a description will be given of a configuration of a lens barrel (lens apparatus) 1 according to this embodiment. FIG. 1 is a sectional view of the lens barrel 1 in a WIDE (wide-angle) state. FIG. 2 is a sectional view of the lens barrel 1 in a TELE (telephoto) state. FIGS. 1 and 2 each illustrate sections of the lens barrel 1 including the optical axis OA.

The lens barrel 1 can change the angle of view of the image pickup optical system or perform zooming. Each lens unit moved to a predetermined optical position corresponding to an angle of view of a predetermined zoom position can form an image by imaging light from an object on an image pickup element (image sensor) (see FIG. 10). In this embodiment, the lens barrel 1 includes totally six units or a first lens unit 100, a second lens unit 200, a third lens unit 300, a fourth lens unit 400, a fifth lens unit 500, and a sixth lens unit 600. The lens unit includes a lens unit 500 in order from an object side to an image side.

The third lens unit 300 includes lenses 301, 302, and 303 held by a first lens holding barrel (first lens holding member) 10. The first lens holding barrel 10 is movable in a direction along the optical axis OA (optical axis direction) while holding the lenses 301, 302, and 303. The fourth lens unit 400, the fifth lens unit 500, and the sixth lens unit 600 are held by a second lens holding barrel (second lens holding member) 20. The second lens holding barrel 20 is movable in the optical axis direction while holding the fourth lens unit 400, the fifth lens unit 500, and the sixth lens unit 600.

This embodiment is not limited to this lens unit configuration. For example, the lens 302 may serve as an image stabilizing lens that is movable in a plane orthogonal to the optical axis OA by an image stabilization mechanism. The fifth lens unit 500 is held by the second lens holding barrel 20 in this embodiment, but may be held movably in the optical axis direction relative to the second lens holding barrel 20 and have a focusing function. Each of the first lens holding barrel 10 and the second lens holding barrel 20 holds a plurality of lenses in this embodiment but may hold only a single lens.

Next follows a description of a unit for moving the first lens holding barrel 10 and the second lens holding barrel 20 in the optical axis direction. A linear guide cylinder 2 is a fixed component fixed to the fixing cylinder 3. A cam cylinder 4 is rotatably disposed on the outer circumference of the linear guide cylinder 2. The cam cylinder 4 is connected to a zoom operation ring 5. When the zoom operation ring 5 is rotated, the cam cylinder 4 rotates around the optical axis OA relative to the linear guide cylinder 2.

The linear guide cylinder 2 has linear guide grooves that regulate movements of the first lens holding barrel 10 and the second lens holding barrel 20 in the rotational directions and guides their movements in the optical axis direction. The cam cylinder 4 has cam grooves having trajectories of different angles in the rotational direction corresponding to the first lens holding barrel 10 and the second lens holding barrel 20, respectively. On the other hand, cam followers (first cam followers) 11 are provided on the first lens holding barrel 10, and cam followers (second cam followers) 21 are provided on the second lens holding barrel 20. The cam followers 11 and 21 are engaged with the corresponding linear guide grooves of the linear guide cylinder 2 and the corresponding cam grooves of the cam cylinder 4.

This configuration rotates the cam cylinder 4, when the zoom operation ring 5 is rotated. The cam followers 11 and 21 move the first lens holding barrel 10 and the second lens holding barrel 20 back and forth in the optical axis direction by a predetermined distance corresponding to the rotational angle by the engagement between the linear guide groove in the linear guide cylinder 2 and the cam groove in the cam cylinder 4.

The relative positional relationship between the first lens holding barrel 10 and the second lens holding barrel 20 differs depending on the zoom position. FIGS. 1 and 2 illustrate the WIDE state and the TELE state of the lens barrel 1 in an example, respectively. In this embodiment, a spacing distance between the first lens holding barrel 10 and the second lens holding barrel 20 in the optical axis direction is the longest in the WIDE state and the shortest in the TELE state. However, this embodiment is not limited to this type, and may be the most distant state or the closest state in a middle zoom position between WIDE and TELE. In other words, as long as the relative position between the first lens holding barrel 10 and the second lens holding barrel 20 changes, the maximum and minimum distances at a predetermined zoom position are not limited.

Figure 3A:
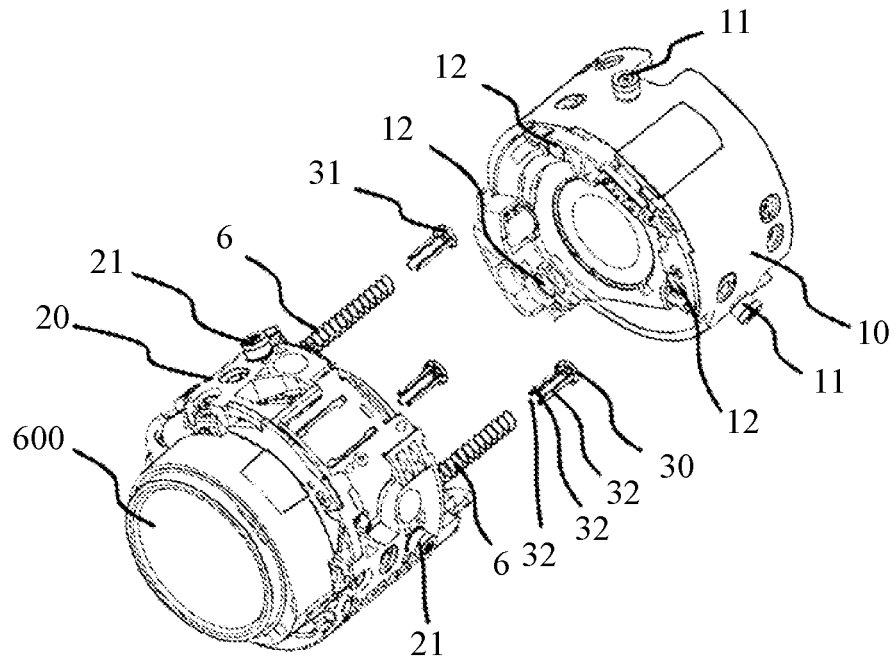
FIGS. 3A and 3B are exploded perspective views of a lens-units biasing structure according to this embodiment.
Figure 3B:
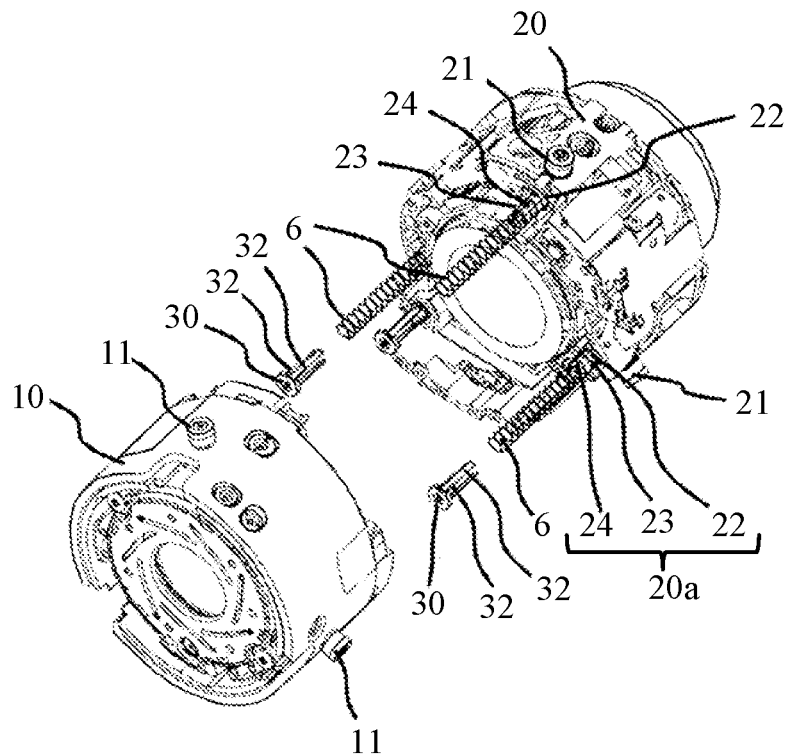

Referring now to FIGS. 3A to 6, a description will be given of the lens-units biasing structure according to this embodiment. FIGS. 3A and 3B are exploded perspective views of main components of the lens-units biasing structure according to this embodiment. FIGS. 3A and 3B are diagrams viewed from different directions. As illustrated in FIGS. 3A and 3B, three biasing units are arranged between the first lens holding barrel 10 and the second lens holding barrel 20.

The biasing unit has a compression spring (urging member) 6 and a guide member (first guide member) 30 for guiding the expansion and contraction of the compression spring 6. The guide member 30 has a spring receiving surface (first receiver) 31 that receives one end of the compression spring 6. A spring guide portion (second guide member) 20a is integrated with the second lens holding barrel 20. The second lens holding barrel 20 has a spring receiving surface (second receiver) 22 for receiving the other end of the compression spring 6. The compression spring 6 is stretchably held between the spring receiving surface 31 of the guide member 30 and the spring receiving surface 22 of the second lens holding barrel 20. The first lens holding barrel 10 has a contact portion 12 which the guide member 30 contacts.

Due to the above positional relationship, the biasing force by the compression spring 6 acts in the optical axis direction between the first lens holding barrel 10 and the second lens holding barrel 20, and the first lens holding barrel 10 and the second lens holding barrel 20 are biased so as to separate from each other. The compression spring 6 expands and contracts in the optical axis direction while applying the biasing force to the first lens holding barrel 10 and the second lens holding barrel 20 in the optical axis direction.

Next follows a detailed description of the shape of the biasing unit. The guide member 30 has three guide protrusions (first guide protrusions) 32 extending from the spring receiving surface 31 around the spring axis in the optical axis direction. The guide protrusion 32 is formed on the inner diameter side of the compression spring 6, and serves as a guide for suppressing buckling of the compression spring 6. The spring guide portion 20a of the second lens holding barrel 20 has three guide protrusions (second guide protrusions) 23 extending from the spring receiving surface 22 around the spring axis in the optical axis direction.

Figure 4:
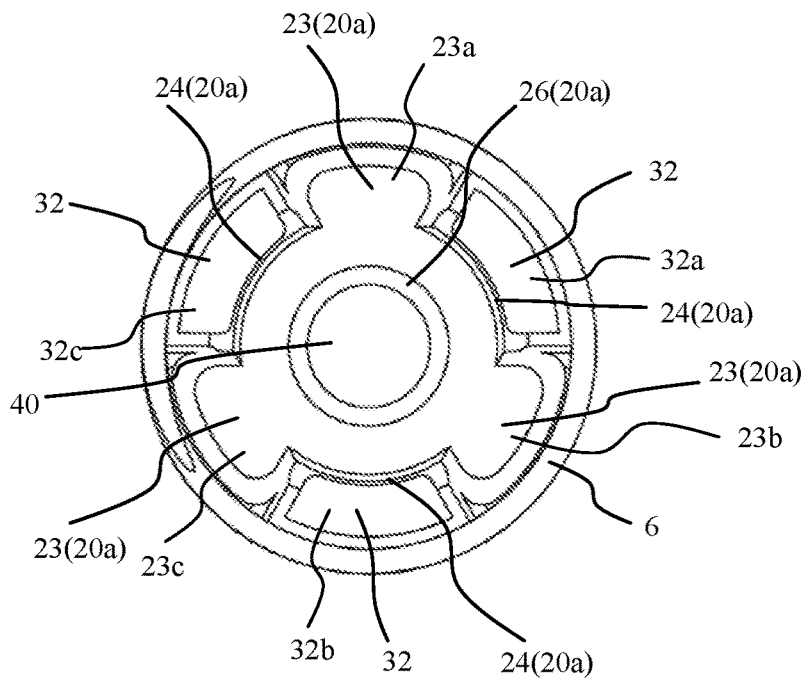
FIG. 4 is a sectional view of the lens-units biasing structure according to this embodiment in a plane orthogonal to the optical axis.

FIG. 4 is a partial sectional view on a plane orthogonal to the optical axis OA, showing a positional relationship between the guide protrusions 32 and the guide protrusions 23 in the lens-units biasing structure according to this embodiment. As illustrated in FIG. 4, the guide protrusion 32 of the guide member 30 and the guide protrusion 23 of the second lens holding barrel 20 are arranged in alternate phases around the spring axis. In other words, the guide protrusions 32 and 23 have a plurality of protrusions 32a, 32b, 32c, 23a, 23b, and 23c that alternate around the axis of the compression spring 6 so that they are engaged with each other. Thus, in this embodiment, in the use state, the guide protrusions 32 and 23 overlap each other and are engaged with each other in the optical axis direction. Thereby, the guide member 30 is restricted from rotating around the spring axis. The spring guide portion 20a of the second lens holding barrel 20 has a concave surface 24 corresponding to the inner diameter surface of the guide protrusion 32 in the same phase as that of the guide protrusion 32. Since the inner diameter portion of the guide protrusion 32 and the concave surface 24 are engaged in the radial direction, they can relatively expand and contract in the optical axis direction coaxially with the spring axis.

Figure 5:
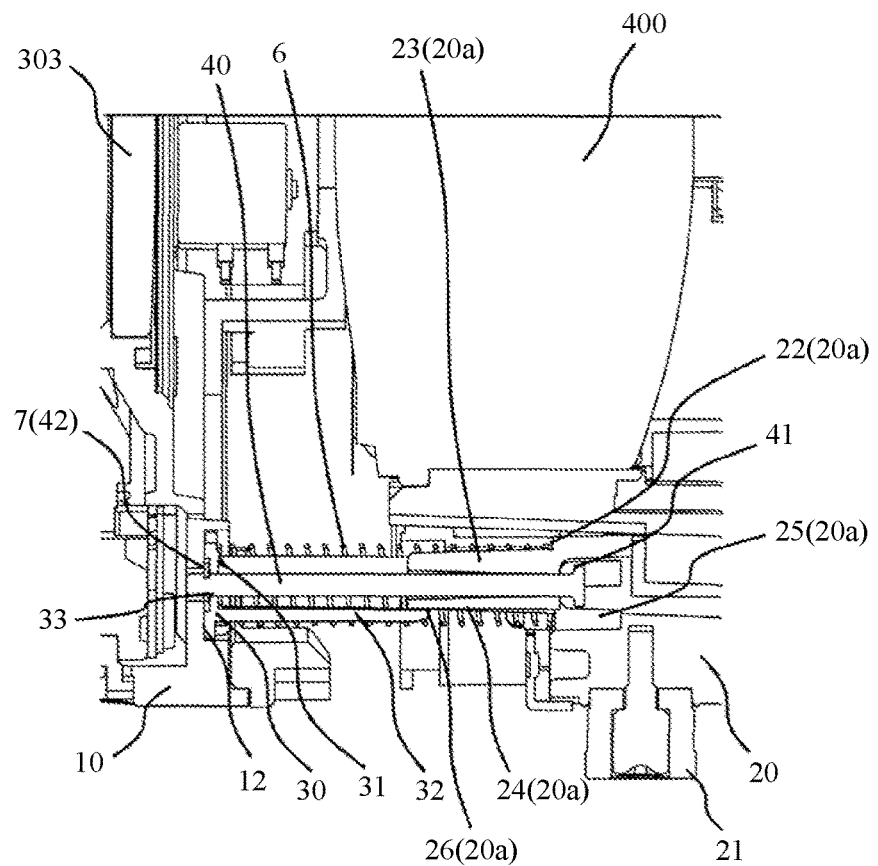
FIG. 5 is a partial sectional view of the lens-units biasing structure according to this embodiment in the WIDE state.
Figure 6:
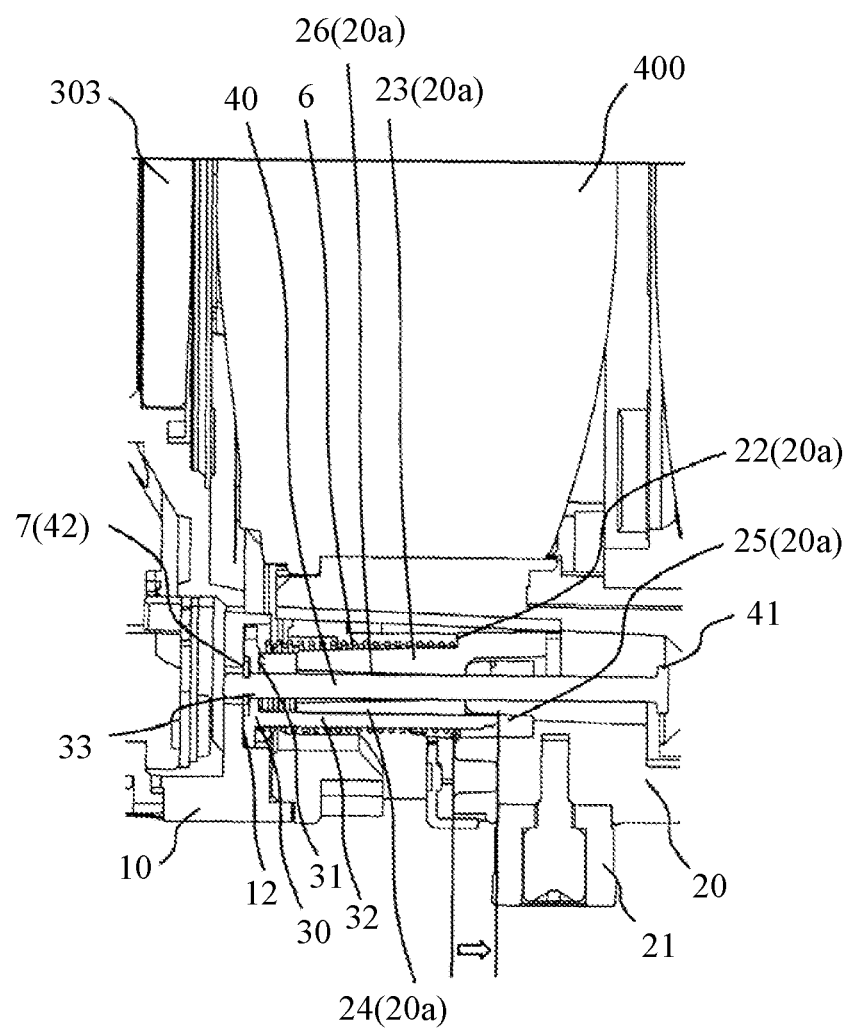
FIG. 6 is a partial sectional view of the lens-units biasing structure according to this embodiment in the TELE state.

FIG. 5 is a partial sectional view of the lens-units biasing structure in the WIDE state. FIG. 6 is a partial sectional view of the lens-units biasing structure in the TELE state. In this embodiment, the relative distance between the first lens holding barrel 10 and the second lens holding barrel 20 is the longest in the WIDE state and the shortest in the TELE state. That is, in the use state, the compression spring 6 is in the most extended state in the WIDE state and in the most shrunk state in the TELE state. However, even when the compression spring 6 is in the most extended state in the WIDE state, the biasing force of the compression spring 6 is not lost because the compression spring 6 is shorter than the natural length.

As illustrated in FIG. 5, even when the compression spring 6 is in the most extended state, the tip of the guide protrusion 32 of the guide member 30 and the tip of the guide protrusion 23 of the second lens holding barrel 20 overlap each other in the optical axis direction. In other words, in the use state, since the guide protrusions 32 and 23 have areas that always partially overlap each other in the optical axis direction, the guide member 30 does not come off from the second lens holding barrel 20 in the use state.

As illustrated in FIG. 6, when the compression spring 6 is in the most shrunk state, the tip of the guide protrusion 32 of the guide member 30 can be moved to a position that protrudes from the spring receiving surface 22 of the spring guide 20a toward the second lens holding barrel 20. In this embodiment, the spring receiving surface 22 of the spring guide portion 20a has a hole portion 25 in the same phase as that of the guide protrusion 32, and the guide protrusion 32 can enter the hole portion 25. The hole portion 25 is also formed in an area overlapping the cam follower 21 in the optical axis direction, and the tip of the guide protrusion 32 can enter the area overlapping the cam follower 21 in the optical axis direction. This configuration can dispose the compression spring 6 in a small space, and can increase the expansion ratio.

On the other hand, in the configuration example of the conventional cylinder spring, the expansion rate of the spring is limited. In other words, the cylinder spring configuration has an area where the cylinders overlap each other in the optical axis direction so as not to come off even in the most extended state. On the other hand, in the shortest state, one cylinder can only shrink to a position where it contacts the bottom surface of the other cylinder. Where the longest spring length is set to 1, the shortest spring length must be greater than ½. This means that the cylinder spring needs to be twice as long as a distance change amount when the distance between the two lens units changes due to zooming or the like. Thus, in the conventional cylinder spring configuration, the installation location of the spring receiving surface 22 is limited, for example, it is necessary to provide the spring receiving surface 22 at an area overlapping the cam follower 21 in the optical axis direction or on the image side of it.

On the other hand, in the configuration according to this embodiment, assume that the distance is 1 between the spring receiving surface 31 of the guide member 30 and the spring receiving surface 22 of the spring guide portion 20a when the compression spring 6 is in the most extended state. At this time, the distance between the spring receiving surface 31 of the guide member 30 and the spring receiving surface 22 of the spring guide portion 20a when the compression spring 6 is in the most shrunk state may be set to a value of ½ or less. In other words, this embodiment improves the design degree of freedom of the installation location of the spring receiving surface 22, and can provide the biasing unit for the lens units in a space-saving manner. As in this embodiment, when the spring receiving surface 22 is disposed on the object side of the cam follower 21 and the guide protrusion 32 having an inner diameter smaller than that of the compression spring 6 is configured to enter an area overlapping the cam follower 21 in the optical axis direction, the configuration can become compact in the radial direction.

The conventional cylinder configuration is often made mainly of metal, thus may become expensive in consideration of the material and processing, and may generate noises due to the frictions between the metal cylinders when the cylinder extends or shrinks. On the other hand, since the guide member 30 can be made of a nonmetallic material, this embodiment can provide an inexpensive biasing unit that generates less noises.

The configuration according to this embodiment can bias the first lens holding barrel 10 and the second lens holding barrel 20 in the optical axis direction using the compression spring 6 via the guide member 30 in the use state. In this embodiment, the guide protrusion 32 of the guide member 30 is configured to enter the hole portion 25 in the spring guide portion 20a, but the reverse relationship is available. In other words, a hole portion may be provided in the guide member 30, and the guide protrusion 23 of the spring guide portion 20a may enter the hole portion. Alternatively, both may be used, and the guide protrusions 32 of the guide member 30 and the guide protrusions 23 of the spring guide portion 20a may be configured to enter hole portions provided in the respective members. In that case, the effect of this embodiment can be further emphasized. This embodiment has described the first lens holding barrel 10 on the object side and the second lens holding barrel 20 on the imaging side but these barrels may be reversely located.

Next follows a description of the biasing force of the biasing unit in this embodiment. The cam follower 11 or 21 may be disposed in the same phase around the optical axis as those of the three biasing units, but does not necessarily have to be disposed in the same phase. This embodiment disposes the cam follower 21 in substantially the same phase as those of the three biasing units, but the cam follower 11 is different in phase from the three biasing units.

The guide member 30 receives the biasing force from the compression spring 6 via the spring receiving surface 31. Since the first lens holding barrel 10 contacts the back surface of the spring receiving surface 31 of the guide member 30 via the contact portion 12, the first lens holding barrel 10 receives the biasing force on the object side in the optical axis direction and this biasing force is transmitted to the cam follower 11. Since the cam follower 11 contacts the cam groove in the cam cylinder 4, the biasing force on the object side in the optical axis direction acts on the cam groove, the play is absorbed between the cam cylinder 4 and the first lens holding barrel 10, and the first lens holding barrel 10 can be held with high accuracy.

Similarly, the second lens holding barrel 20 receives the biasing force of the compression spring 6 on the imaging side in the optical axis direction via the spring receiving surface 22, and this biasing force is transmitted to the cam follower 21. Since the cam follower 21 contacts the cam groove in the cam cylinder 4, the biasing force on the imaging side in the optical axis direction acts on the cam groove, the play is absorbed between the cam cylinder 4 and the second lens holding barrel 20, and the second lens holding barrel 20 can be held with high accuracy.

The compression spring 6 is always shorter than its natural length in the use state (arbitrary state between the WIDE state (wide-angle end) and the TELE state (telephoto end)) and applies the biasing force to the first lens holding barrel 10 and the second lens holding barrel 20. Therefore, the first lens holding barrel 10 and the second lens holding barrel 20 can be stably held in all areas between the WIDE state and the TELE state. The guide member 30 can be held by using the guide shaft 40 so that the guide member 30 does not come off in a non-use state (for example, an assembled state).

Figure 7:
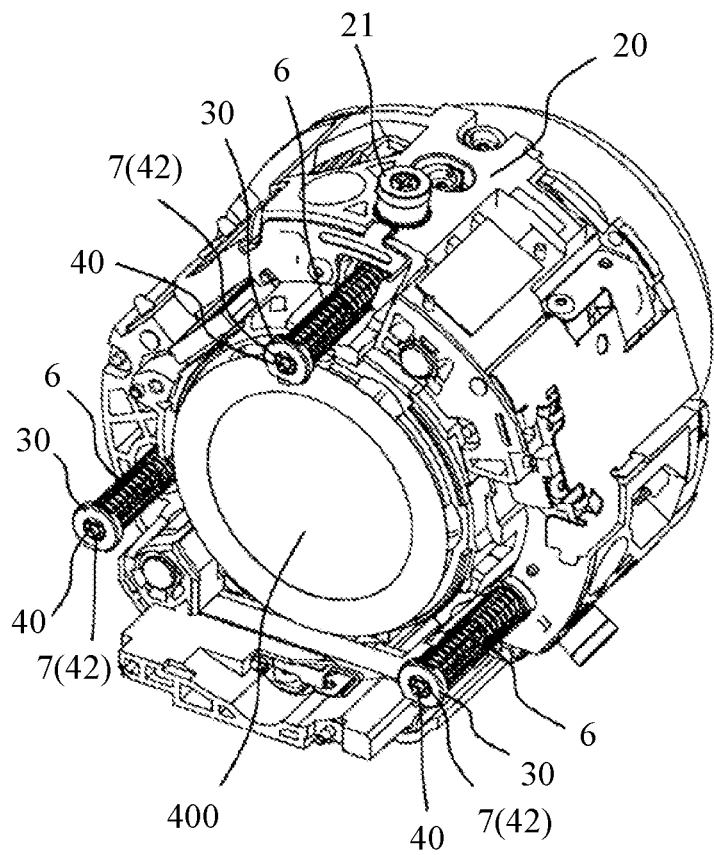
FIG. 7 is a perspective view of a unit including the lens-units biasing structure according to this embodiment.
Figure 8:
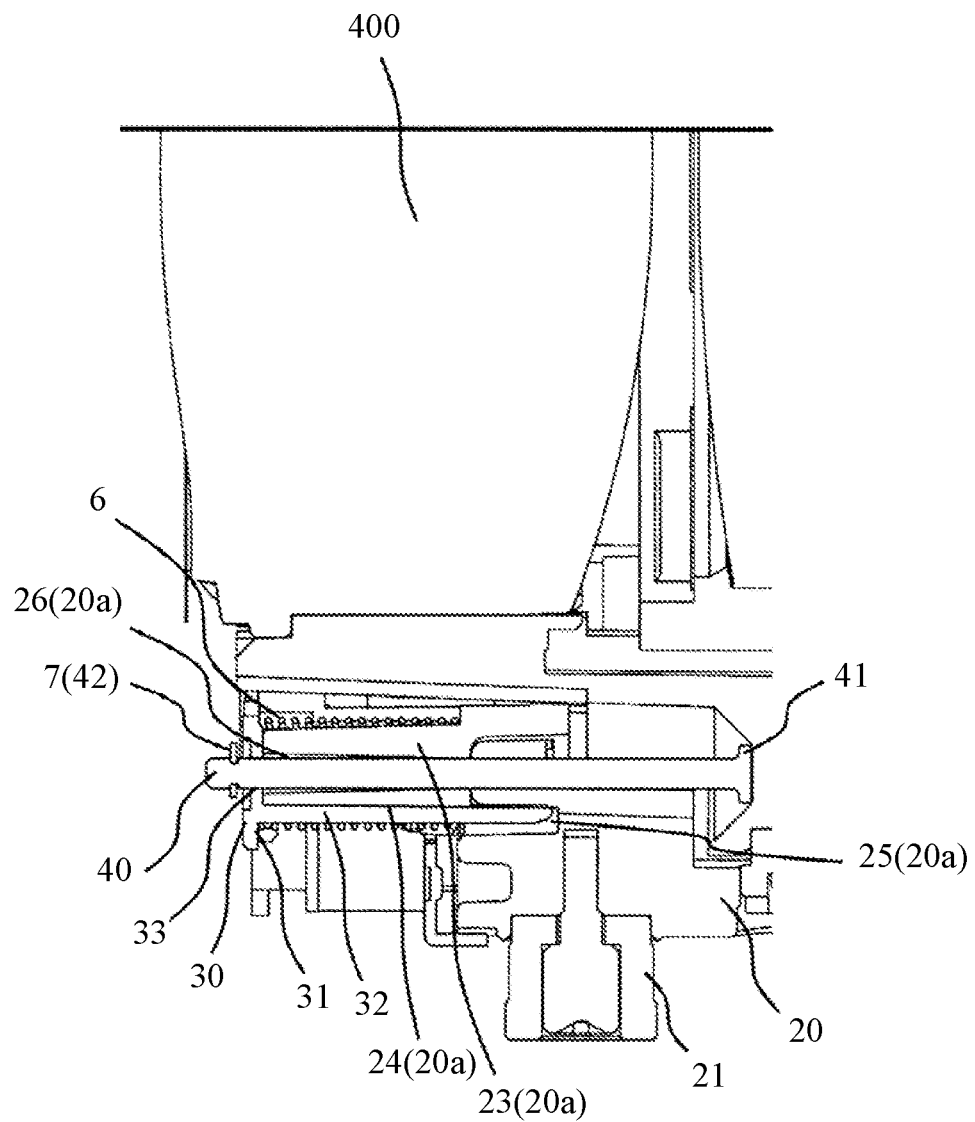
FIG. 8 is a partial sectional view of the lens-units biasing structure according to this embodiment in a compressed state.
Figure 9:
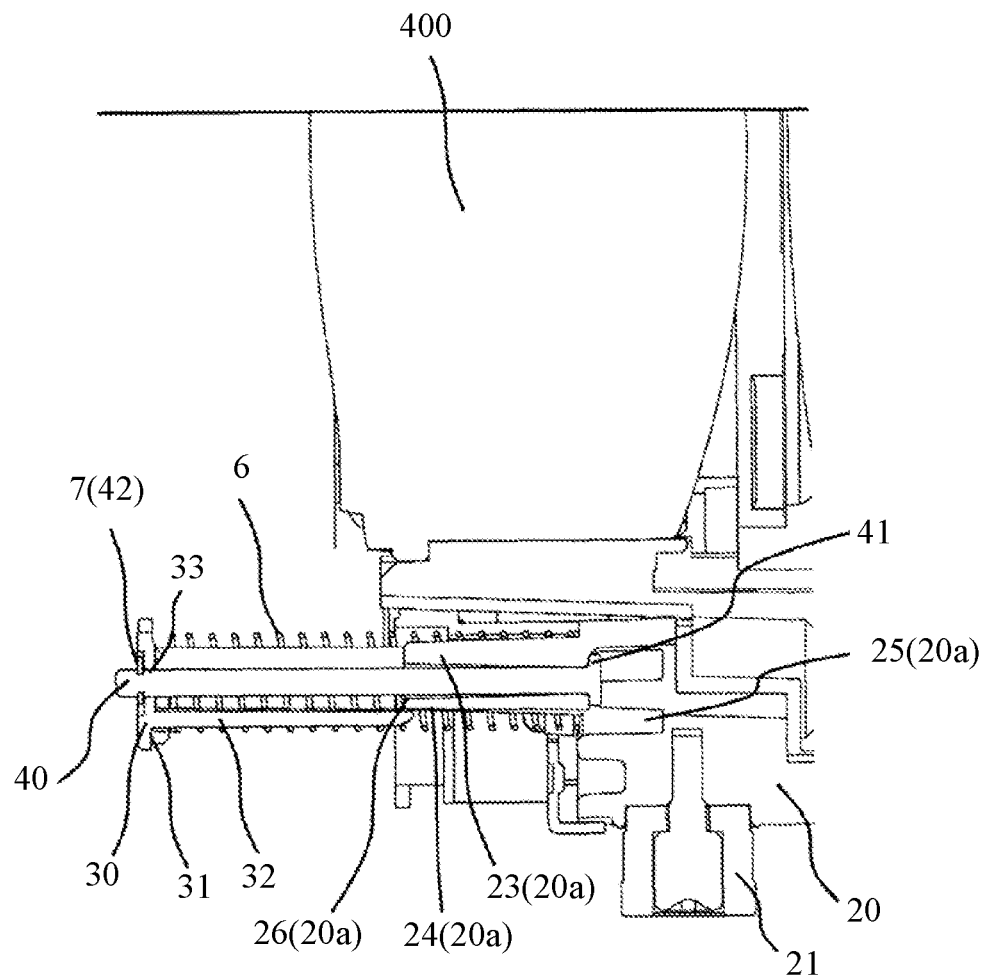
FIG. 9 is a partial sectional view of the unit state of the lens-units biasing structure according to this embodiment.

Referring now to FIGS. 7 to 9, a description will be given of the configuration of the guide shaft 40 according to this embodiment. FIG. 7 is a perspective view of a unit (unit including the lens-units biasing structure) in which the second lens holding barrel 20 and the guide member 30 are assembled. FIG. 8 is a partial sectional view of the lens-units biasing structure in a compressed state. FIG. 9 is a partial sectional view in the unit state of the lens-units biasing structure. Herein, the spring length of the compression spring 6 in the compressed state is shorter than that in the use state (WIDE-TELE state) according to this embodiment, and the spring length of the compression spring 6 in the unit state is longer than that in the use state (WIDE-TELE state) according to this embodiment.

A guide-shaft perforation hole (second perforation hole) 26 is formed at the center of the guide protrusion 23 and the concave surface 24 of the spring guide portion 20a. Similarly, a guide-shaft perforation hole 33 (first perforation hole) is formed at the center of the guide member 30 (guide protrusion 32). A stopper portion (second stopper portion) 41 having a partially larger shaft diameter is provided at one end of the guide shaft 40. Since the diameter of the stopper portion 41 is larger than the inner diameter of the guide-shaft perforation hole 26 of the spring guide portion 20a, the guide shaft 40 does not come off to the object side. A narrow groove is formed at the other end of the guide shaft 40 opposite to the stopper portion 41. A component (stopper ring 7) such as an E-ring having an outer diameter larger than the guide-shaft perforation hole 33 is attached to the narrow groove. Thereby, a stopper portion (first stopper portion) 42 can be formed which serves similar to the stopper portion 41 (having a diameter larger than that of the guide-shaft perforation hole 33). By attaching the stopper portion 42 to the contact surface side of the guide member 30 with the first lens holding barrel 10, the guide shaft 40 can be prevented from coming off to the imaging side. The stopper ring 7 can be attached in the compressed state as illustrated in FIG. 8. This embodiment forms the stopper portion 42 such that the stopper ring 7 is attached to the narrow groove of the guide shaft 40, but the present invention is not limited to this embodiment. The stopper portion 42 may be formed by another configuration such as bonding.

As illustrated in FIG. 8, in the compressed state, the spring receiving surface 31 of the guide member 30 contacts the tip end of the guide protrusion 23 of the spring guide portion 20a, so that further compression is not available. Due to a predetermined gap (clearance) exists between the tip of the guide protrusion 32 of the guide member 30 and the bottom surface of the hole portion 25 in the spring guide portion 20a, the guide protrusion 32 does not contact it. Since the guide protrusion 32 is longer than the guide protrusion 23 and is not connected on the inner diameter side like the guide protrusion 23, the guide protrusion 32 may be broken when an extra force is applied. Since the spring length of the compression spring 6 in the compressed state is shorter than the spring length in the used state, the guide member 30 does not contact the second lens holding barrel 20 in the use state.

When the stopper ring 7 is attached in the state of FIG. 8 to form the second stopper portion 42, the guide shaft 40 and the stopper ring 7 and the guide member 30 can move integrally in the optical axis direction. The guide member 30 receives a force in a direction separating from the second lens holding barrel 20 by the spring force of the compression spring 6, but as illustrated in FIG. 9, the guide member 30 is held so as not to come off. In the unit state illustrated in FIG. 9, the stopper portion 41 contacts the root portion of the guide protrusion 23 of the spring guide portion 20a, and the guide shaft 40 and the guide member 30 do not any longer move in the direction separating from the second lens holding barrel 20.

The tips of the guide protrusion 32 of the guide member 30 and the guide protrusion 23 of the spring guide portion 20a have areas overlapping each other in the optical axis direction. The spring length of the compression spring 6 in the unit state is longer than that in the use state, and the stopper portion 41 never contacts the root portion of the guide protrusion 23 of the guide portion 20a in the use state.

As described above, by using the guide shaft 40, the second lens holding barrel 20 and the guide member 30 are held without being disengaged from each other, can be treated as a unit, and easily assembled and the like.

Thus, in this embodiment, in a state where the first lens holding barrel 10 and the second lens holding barrel 20 are closer to each other than they are in a predetermined state, at least part of the guide protrusion 32 and 23 is located at a position that protrudes from the spring receiving surface 31 or 22. The guide protrusion 32 may be longer than guide protrusion 23. In a state where the first lens holding barrel 10 and the second lens holding barrel 20 are closer to each other than those in the predetermined state, the guide protrusion 32 is located at a position that protrudes from the spring receiving surface 22 toward the second lens holding barrel 20. Alternatively, the guide protrusion 23 may be longer than the guide protrusion 32. At this time, in a state where the first lens holding barrel 10 and the second lens holding barrel 20 are closer to each other than they are in the predetermined state, the guide protrusion 23 is located at a position protruding from the spring receiving surface 31 toward the first lens holding barrel 10.

Figure 10:
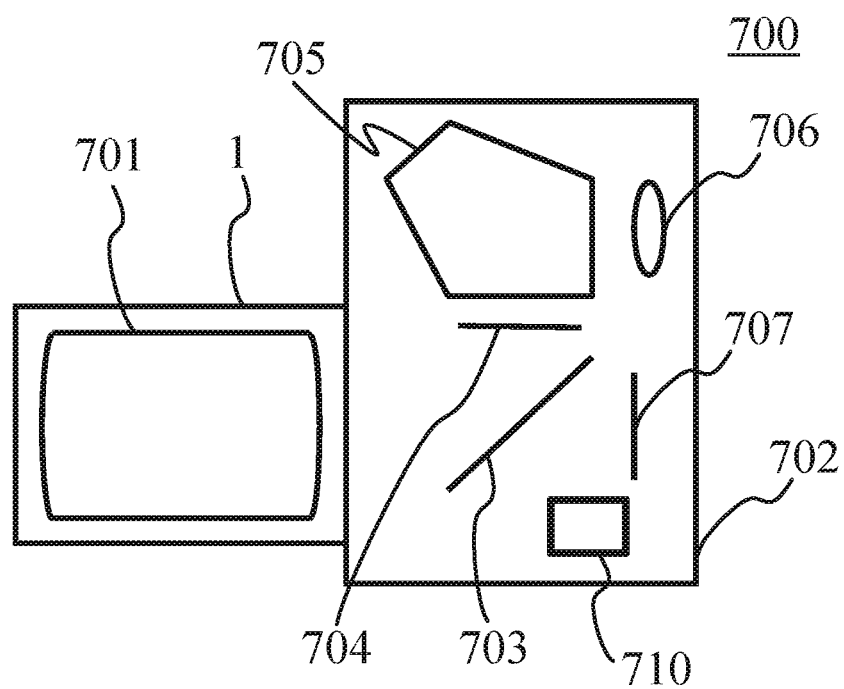
FIG. 10 is a block diagram of an image pickup apparatus according to this embodiment.

Referring now to FIG. 10, a description will be given of an image pickup apparatus according to this embodiment. FIG. 10 is a configuration diagram of an image pickup apparatus (single-lens reflex camera) 700. In FIG. 10, a lens barrel (lens apparatus) 1 as an interchangeable lens has an image pickup optical system (lens unit) 701. A camera body (image pickup apparatus body) 702 includes a quick return mirror 703, a focus plate 704, a penta roof prism 705, an eyepiece 706, and the like. The quick return mirror 703 reflects a light flux formed via the image pickup optical system 701 upwardly. The focus screen 704 is disposed at an imaging position of the image pickup optical system 701. The penta roof prism 705 converts a reverse image formed on the focus plate 704 into an erect image. The user can observe the erect image via the eyepiece 706.

An image pickup element 707 includes a CCD sensor or a CMOS sensor, and photoelectrically converts an optical image (object image) formed via the image pickup optical system 701 to output image data. During imaging, the quick return mirror 703 is retracted from the optical path, and an optical image is formed on the image pickup element 707 via the image pickup optical system 701. A controller 710 has a CPU and controls the operation of each unit of the image pickup apparatus 700.

The image pickup apparatus 700 includes the camera body 702 having the image pickup element 707 and the lens barrel 1 detachably attached to the camera body 702, but is not limited to this type. The image pickup apparatus may be a type in which a camera body and a lens barrel are integrated with each other, or may be a mirrorless single-lens reflex camera (mirrorless camera) without a quick return mirror.

This embodiment can provide a compact lens apparatus and an image pickup apparatus having the same, each of which can hold lens units with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-114657, filed on Jun. 20, 2019, which is hereby incorporated by reference herein in its entirety.

What is claimed is:

1. A lens apparatus comprising:
a first lens holding member held by a first cam follower that is movable in an optical axis direction;
a second lens holding member held by a second cam follower that is movable in the optical axis direction;
an urging member disposed between the first lens holding member and the second lens holding member;
a first guide member configured to contact the first lens holding member and to guide the urging member; and
a second guide member integrated with the second lens holding member and configured to guide the urging member,
wherein the first guide member includes:
a first receiver configured to receive the urging member; and
a first guide protrusion extending in the optical axis direction from the first receiver toward the second lens holding member,
wherein the second guide member includes:
a second receiver configured to receive the urging member; and
a second guide protrusion extending in the optical axis direction from the second receiver toward the first lens holding member,
wherein the first guide protrusion and the second guide protrusion have areas that overlap each other in the optical axis direction in a use state,
wherein at least part of the first guide protrusion and the second guide protrusion protrudes from the first receiver or the second receiver;
wherein the first guide protrusion is longer than the second guide protrusion, and
wherein the first guide protrusion protrudes from the second receiver toward the second lens holding member.

2. The lens apparatus according to claim 1, wherein the second receiver has a hole portion into which the first guide protrusion can enter.

3. A lens apparatus comprising:
a first lens holding member held by a first cam follower that is movable in an optical axis direction;
a second lens holding member held by a second cam follower that is movable in the optical axis direction;
an urging member disposed between the first lens holding member and the second lens holding member;
a first guide member configured to contact the first lens holding member and to guide the urging member; and
a second guide member integrated with the second lens holding member and configured to guide the urging member,
wherein the first guide member includes:
a first receiver configured to receive the urging member; and
a first guide protrusion extending in the optical axis direction from the first receiver toward the second lens holding member,
wherein the second guide member includes:
a second receiver configured to receive the urging member; and
a second guide protrusion extending in the optical axis direction from the second receiver toward the first lens holding member,
wherein the first guide protrusion and the second guide protrusion have areas that overlap each other in the optical axis direction in a use state,
wherein at least part of the first guide protrusion and the second guide protrusion protrudes from the first receiver or the second receiver, and
wherein when the urging member is compressed, part of the first guide protrusion has an area overlapping the second cam follower in the optical axis direction.

4. The lens apparatus according to claim 3, wherein the second guide protrusion is longer than the first guide protrusion, and
wherein the second guide protrusion protrudes from the first receiver toward the first lens holding member.

5. A lens apparatus comprising:
a first lens holding member held by a first cam follower that is movable in an optical axis direction;
a second lens holding member held by a second cam follower that is movable in the optical axis direction;
an urging member disposed between the first lens holding member and the second lens holding member;
a first guide member configured to contact the first lens holding member and to guide the urging member; and
a second guide member integrated with the second lens holding member and configured to guide the urging member,
wherein the first guide member includes:
a first receiver configured to receive the urging member; and
a first guide protrusion extending in the optical axis direction from the first receiver toward the second lens holding member,
wherein the second guide member includes:
a second receiver configured to receive the urging member; and
a second guide protrusion extending in the optical axis direction from the second receiver toward the first lens holding member,
wherein the first guide protrusion and the second guide protrusion have areas that overlap each other in the optical axis direction in a use state,
wherein at least part of the first guide protrusion and the second guide protrusion protrudes from the first receiver or the second receiver, and
wherein when the urging member is compressed until the first guide member contacts a tip of the second guide protrusion, there is a clearance between a tip of the first guide protrusion and the second lens holding member.

6. A lens apparatus comprising:
a first lens holding member held by a first cam follower that is movable in an optical axis direction;
a second lens holding member held by a second cam follower that is movable in the optical axis direction;
an urging member disposed between the first lens holding member and the second lens holding member;
a first guide member configured to contact the first lens holding member and to guide the urging member; and
a second guide member integrated with the second lens holding member and configured to guide the urging member,
wherein the first guide member includes:
a first receiver configured to receive the urging member; and a first guide protrusion extending in the optical axis direction from the first receiver toward the second lens holding member, wherein the second guide member includes:
   a second receiver configured to receive the urging member, and
   a second guide protrusion extending in the optical axis direction from the second receiver toward the first lens holding member, wherein the first guide protrusion and the second guide protrusion have areas that overlap each other in the optical axis direction in a use state, wherein at least part of the first guide protrusion and the second guide protrusion protrudes from the first receiver or the second receiver, and wherein the lens apparatus further comprises a guide shaft configured to perforate through a first perforation hole in the first guide protrusion and a second perforation hole formed in the second guide protrusion.

7. The lens apparatus according to claim 6, wherein one end of the guide shaft includes a first stopper having a diameter larger than that of the second perforation hole, and
   wherein the other end of the guide shaft includes a second stopper portion having a diameter larger than that of the first perforation hole.

8. The lens apparatus according to claim 7, wherein the first guide member is biased in a direction separating away from the second lens holding member by a biasing force of the urging member, and
   wherein when the first stopper portion contacts the first guide member, and the second stopper portion contacts the second lens holding member, part of the first guide protrusion and part of the second guide protrusion have areas overlapping each other in the optical axis direction.

9. An image pickup apparatus comprising:
a lens apparatus; and
an image pickup element,
wherein the lens apparatus includes:
a first lens holding member held by a first cam follower that is movable in an optical axis direction;
a second lens holding member held by a second cam follower that is movable in the optical axis direction;
an urging member disposed between the first lens holding member and the second lens holding member;
a first guide member configured to contact the first lens holding member and to guide the urging member; and
a second guide member integrated with the second lens holding member and configured to guide the urging member, wherein the first guide member includes:
   a first receiver configured to receive the urging member; and
   a first guide protrusion extending in the optical axis direction from the first receiver toward the second lens holding member, wherein the second guide member includes:
   a second receiver configured to receive the urging member; and
   a second guide protrusion extending in the optical axis direction from the second receiver toward the first lens holding member, wherein the first guide protrusion and the second guide protrusion have areas that overlap each other in the optical axis direction in a use state, wherein at least part of the first guide protrusion and the second guide protrusion protrudes from the first receiver or the second receiver, wherein the first guide protrusion is longer than the second guide protrusion, and wherein the first guide protrusion protrudes from the second receiver toward the second lens holding member.

* * * * *